(12) United States Patent
Huang et al.

(10) Patent No.: US 12,519,789 B2
(45) Date of Patent: Jan. 6, 2026

(54) VIRTUAL AUTHENTICATION REALM SPECIFIED BY WILDCARD ELEMENTS

(71) Applicant: Ruckus IP Holdings LLC, Claremont, NC (US)

(72) Inventors: Liangyi Huang, Taoyuan (TW); Ya-Ling Yang, Taipei (TW); Yao Wen Chang, Taipei (TW); Pin Hsiao, Taoyaun (TW)

(73) Assignee: Ruckus IP Holdings LLC, Claremont, NC (US)

( * ) Notice: Subject to any disclaimer, the term of this patent is extended or adjusted under 35 U.S.C. 154(b) by 213 days.

(21) Appl. No.: 18/065,311

(22) Filed: Dec. 13, 2022

(65) Prior Publication Data
US 2023/0198986 A1    Jun. 22, 2023

Related U.S. Application Data

(60) Provisional application No. 63/290,683, filed on Dec. 17, 2021.

(51) Int. Cl.
*H04L 9/40* (2022.01)
(52) U.S. Cl.
CPC .................. *H04L 63/0892* (2013.01)
(58) Field of Classification Search
CPC ..... H04L 63/08; H04L 63/0892; H04L 63/10; H04L 2101/345; H04W 12/06; H04W 48/18
See application file for complete search history.

(56) References Cited

U.S. PATENT DOCUMENTS 8,555,350 B1 *  10/2013  Shatzkamer ........ H04L 63/0892
                                                    370/335
2003/0217285 A1 *  11/2003  Sanchez Herrero ..........
                                                    H04L 63/0892
                                                    726/12
(Continued)

FOREIGN PATENT DOCUMENTS

CN   111049789 A  *  4/2020  .......... H04L 61/1511
NO      336812 B1  *  11/2015  ........... H04L 61/301

OTHER PUBLICATIONS

Oiwa, Yutaka, et al. "PAKE-based mutual HTTP authentication for preventing phishing attacks." Proceedings of the 18th international conference on World wide web. 2009. (Year: 2009).*

(Continued)

*Primary Examiner* — Michael Simitoski
(74) *Attorney, Agent, or Firm* — Steven Stupp

(57) ABSTRACT

During operation, a computer system may receive, from an electronic device, a login request, where the login request includes or specifies an authentication realm in a network. Then, the computer system may compute whether the authentication realm at least partially matches a predefined authentication realm in the network, where the predefined authentication realm in the network includes at least one wildcard element, and where the partial match is for elements in the predefined authentication realm other than the at least one wildcard element. When there is a partial match, the computer system may provide, to a second computer system, an authentication request based at least in part on the login request. Next, the computer system may receive, from the second computer system, an authentication response. When the authentication response indicates successful authentication, the computer system may provide, to the electronic device, a login response.

20 Claims, 7 Drawing Sheets

(56) References Cited

U.S. PATENT DOCUMENTS

| | | | | |
|---|---|---|---|---|
| 2004/0153555 A1* | 8/2004 | Haverinen | ............ | H04L 61/301 713/168 |
| 2004/0193712 A1* | 9/2004 | Benenati | ........... | H04W 12/0431 709/225 |
| 2006/0077926 A1* | 4/2006 | Rune | ....................... | H04L 45/34 370/328 |
| 2007/0143613 A1* | 6/2007 | Sitch | ..................... | H04W 76/50 713/168 |
| 2007/0201469 A1* | 8/2007 | Iyer | ....................... | H04L 61/103 370/395.52 |
| 2008/0072301 A1* | 3/2008 | Chia | .................. | H04L 63/0815 726/8 |
| 2009/0077618 A1* | 3/2009 | Pearce | ................ | H04L 63/0892 726/1 |
| 2010/0303064 A1* | 12/2010 | Bari | ...................... | H04L 63/205 370/352 |
| 2011/0292830 A1* | 12/2011 | Yanggratoke | ........... | H04L 47/10 370/253 |
| 2013/0210391 A1* | 8/2013 | Zhou | .................... | H04W 12/065 455/411 |
| 2015/0143453 A1* | 5/2015 | Erb | ...................... | H04L 41/0893 726/1 |
| 2016/0301680 A1* | 10/2016 | Main | ..................... | H04W 12/37 |
| 2021/0281445 A1* | 9/2021 | Trim | .................... | H04L 12/4641 |
| 2023/0140828 A1* | 5/2023 | Durvasula | .............. | G06N 5/046 705/7.37 |

OTHER PUBLICATIONS

Oiwa, Yutaka, et al. Mutual authentication protocol for HTTP. No. rfc8120. 2017. (Year: 2017).*

Cisco. "Wildcard in realm list for RADIUS server?", published Jul. 5, 2021. < https://community.cisco.com/t5/wireless/wildcard-in-realm-list-for-radius-server/td-p/3045703>. (Year: 2021).*

* cited by examiner

VIRTUAL AUTHENTICATION REALM SPECIFIED BY WILDCARD ELEMENTS

CROSS REFERENCE TO RELATED APPLICATION

This application claims priority under 35 U.S.C. 119(e) to U.S. Provisional Application Ser. No. 63/290,683, "Virtual Authentication Realm Specified by Wildcard Elements," filed on Dec. 17, 2021, by Liangyi Huang, et al. the contents of which are herein incorporated by reference.

FIELD

The described embodiments relate to techniques for authenticating one or more devices to an authentication realm in a network based at least in part on a wildcard element in a login or authentication request.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

Authentication to networks may be logically subdivided into different portions (which are henceforth referred to as 'realms' or 'authentication realms'). For example, a given realm may correspond to a state, a region, a country, etc. In general, a given realm may be a security policy domain defined for a web or application server. Note that the different realms allow login activity to be tracked and optionally allow users to be segmented or segregated based at least in part on the realm(s) they are allowed to access.

However, it is typically difficult for a user or a network operator to define a realm. For example, a network operator may need to specify or define the realm by reconfiguring a controller of computer network devices (such as access points, routers and/or switches) in a network. This process is often time-consuming and cumbersome. In addition, in existing network infrastructure (such as a controller), there are usually constraints on the maximum number of realms that can be defined.

SUMMARY

A computer system that performs flexible authentication to an authentication realm in a network is described. This computer system includes: an interface circuit that communicates with an electronic device and a second computer system; a processor; and a memory that stores program instructions, where, when executed by the processor, the program instructions cause the electronic device to perform operations. Notably, during operation, the computer system receives, associated with the electronic device, a login request, where the login request includes or specifies the authentication realm in the network. Then, the computer system computes whether the authentication realm at least partially matches a predefined authentication realm in the network, where the predefined authentication realm in the network includes at least one wildcard element, and where the partial match is for elements in the predefined authentication realm other than the at least one wildcard element. When there is a partial match, the computer system provides, addressed to the second computer system, an authentication request based at least in part on the login request. Next, the computer system receives, associated with the second computer system, an authentication response. When the authentication response indicates successful authentication, the computer system provides, addressed to the electronic device, a login response that indicates a successful login to the network.

Note that the computer system may include a controller of computer network devices in the network. Moreover, the second computer system may include an authentication, authorization and accounting (AAA) server.

Furthermore, the authentication realm may be associated with an address in the network of the second computer system.

Additionally, when there is a full match between the authentication realm and a second predefined authentication realm, the computer system performs authentication associated with the electronic device with a third computer system associated with the second predefined authentication realm. Note that the third computer system may be the same as or different from the second computer system.

In some embodiments, the computer system may not be preconfigured with all elements in the authentication realm (and, thus, all the elements in the authentication realm may not be predefined in the computer system).

Moreover, computing whether there is at least a partial match includes performing a look-up operation in a data structure with predefined authentication realms and one or more associated addresses of one or more computer systems that provide authentication services for the predefined authentication realms.

Furthermore, the authentication request may include a remote authentication dial-in user service (RADIUS) authentication request and the authentication response may include a RADIUS authentication response.

Another embodiment provides the second electronic device that performs counterpart operations to at least some of the aforementioned operations of the computer system.

Another embodiment provides the electronic device that performs counterpart operations to at least some of the aforementioned operations of the computer system.

Another embodiment provides a system that includes the computer system and the second computer system.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by one of the aforementioned components. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
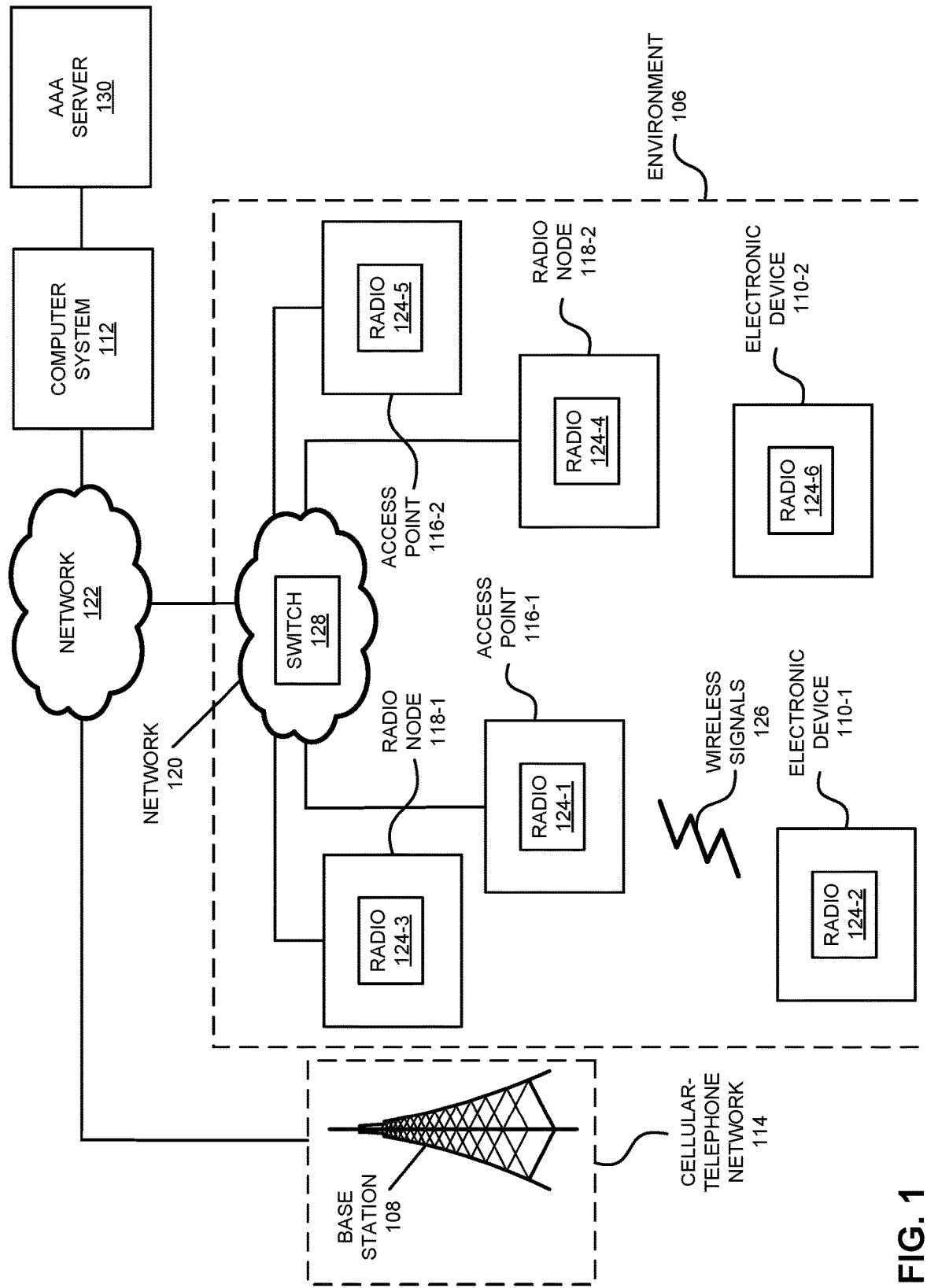
FIG. 1 is a block diagram illustrating an example of communication among electronic devices in accordance with an embodiment of the present disclosure.

A computer system (such as a controller, which may include one or more computers) that performs flexible authentication to a authentication realm in a network is described. During operation, the computer system may receive, from an electronic device, a login request, where the login request includes or specifies the authentication realm in the network. Then, the computer system may compute whether the authentication realm at least partially matches a predefined authentication realm in the network, where the predefined authentication realm in the network includes at least one wildcard element, and where the partial match is for elements in the predefined authentication realm other than the at least one wildcard element. When there is a partial match, the computer system may provide, to a second computer system (such as a AAA server and, more generally, which may include one or more computers), an authentication request based at least in part on the login request. Next, the computer system may receive, from the second computer system, an authentication response. When the authentication response indicates successful authentication, the computer system may provide, to the electronic device, a login response that indicates a successful login to the network.

By performing the flexible authentication, these communication techniques may facilitate operation of the network. Notably, by using the at least one wildcard element in the authentication realm, a user or a network operator may be able to flexibly define new an arbitrary authentication realm without reconfiguring the computer system in advance to predefine the new authentication realm. This capability may reduce the time and complexity in defining new authentication realms. Moreover, the capability may allow the computer system to support a much larger number of authentication realms than existing communication techniques. Therefore, the communication techniques may allow the network operator to segment the network as needed (e.g., dynamically as a function of time) and/or to keep track of login activity in different authentication realms in the network (such as authentication realms corresponding to different regions, states, cities or countries). Consequently, the communication techniques may improve the user experience when using or managing the network.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE (or another cellular-telephone communication protocol) and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or computer system 112 (which may be a cloud-based controller that manages and/or configures access points 116, radio nodes 118 and/or switch 128, or that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 7:
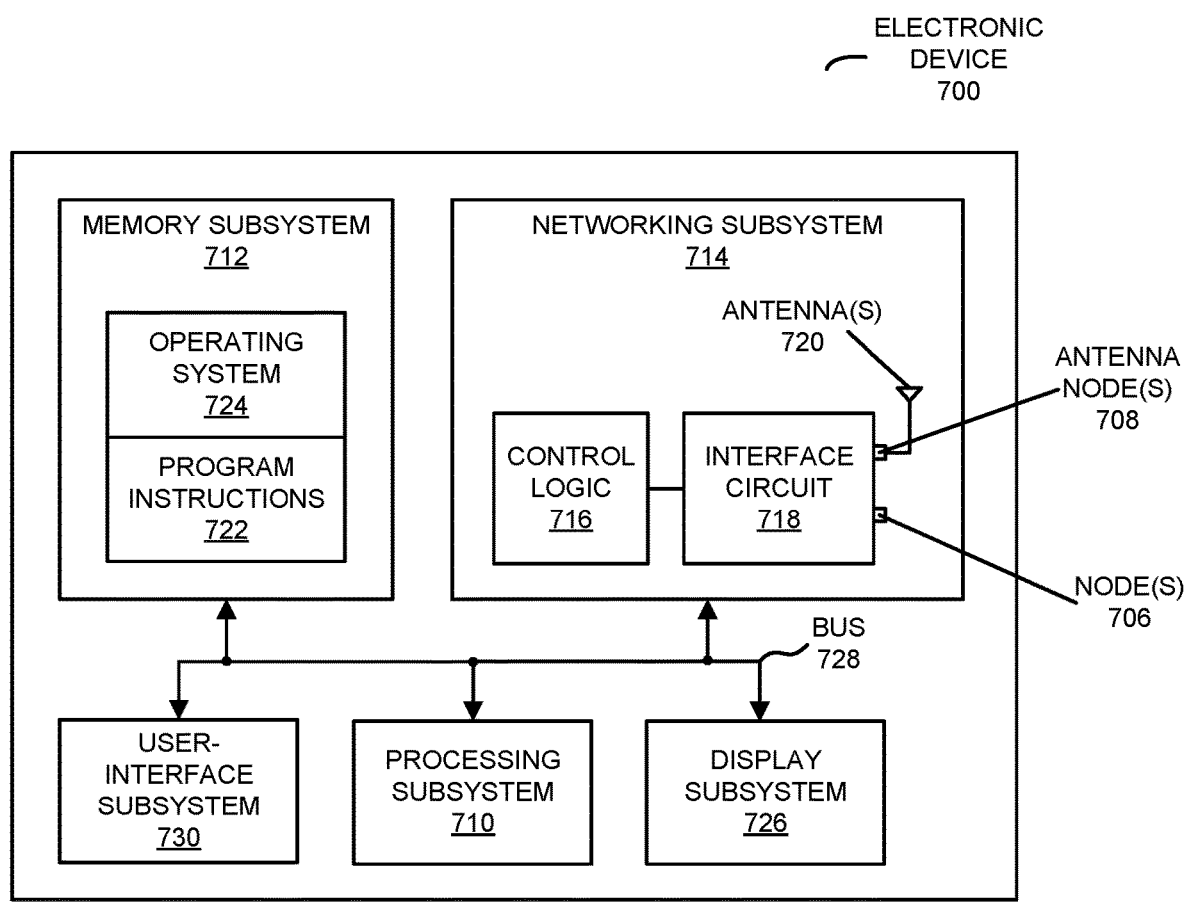
FIG. 7 is a block diagram illustrating an example of an electronic device in accordance with an embodiment of the present disclosure.

As described further below with reference to FIG. 7, electronic devices 110, computer system 112, access points 116, radio nodes 118 and switch 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHZ, 2.4 GHZ, 5 GHZ, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to specify or define authentication realms in a network, such as network 120 and/or network 122. For example, in order to define a new authentication realm, computer system 112 may need to be reconfigured, which is typically time-consuming and complicated.

As described further below with reference to FIGS. 2-6, in order to address these problems, computer system 112 may implement the communication techniques to performs flexible authentication to an authentication realm in a network, such as network 120 and/or network 122. Notably, an electronic device (such as electronic device 110-1) may provide, to computer system 112, a login or access request that includes or specifies an authentication realm in the network. For example, the login request may include credentials of a user of electronic device 110-1 (such as a username and a password) and may include the name or an identifier of the authentication realm.

After receiving the login request, computer system 112 may compute whether the authentication realm at least partially matches a predefined authentication realm in the network, where the predefined authentication realm in the network includes at least one wildcard element or symbol (such as an asterisk), and where the partial match is for elements in the predefined authentication realm other than the at least one wildcard element. For example, computer system 112 may compute whether there is at least a partial match by performing a look-up operation in a data structure in a memory associated with computer system 112 that includes a list of predefined authentication realms and one or more associated addresses of one or more computer systems that provide authentication services for the predefined authentication realms. Note that a given authentication realm (such as the authentication realm) may be associated with a network address (such as an Internet Protocol or IP address) of one of the one or more computer systems, such as AAA server 130 (which is sometimes referred to as a 'second computer system').

When there is a partial match, computer system 112 may provide, to AAA server 130, an authentication request based at least in part on the login request (e.g., the authentication request may include the credentials of the user and/or the authentication realm). After receiving the authentication request, AAA server 130 may authenticate the user of electronic device 110-1. Next, AAA server 130 may provide an authentication response to computer system 112. Moreover, when the authentication response indicates that the user of electronic device 110-1 was successful authenticated, computer system 112 may provide, to electronic device 110-1, a login or access response that indicates a successful login to the network. Note that, in some embodiments, the authentication request may include a RADIUS authentication request and the authentication response may include a RADIUS authentication response.

Alternatively, when there is a full match between the authentication realm and a second predefined authentication realm, computer system 112 may perform authentication associated with electronic device 110-1 (such as of the user of electronic device 110-1) with a third computer system associated with the second predefined authentication realm (e.g., the data structure may include the second predefined authentication realm and the associated network address of the third computer system). For example, the authentication may include providing the authentication request, receiving the authentication response and selectively providing the login response. Note that the third computer system may be the same as or different from AAA server 130.

In this way, the communication techniques may allow computer system 112 to flexibly support a large number of authentication realms, which may be dynamically defined by a user or a network operator of the network. Notably, computer system 112 may not be preconfigured with all elements in the authentication realm (and, thus, all the elements in the authentication realm may not be predefined in computer system 112). For example, the predefined authentication realm may include one or more wildcard elements that allow the user to flexibly define or specify new authentication realms, e.g., by changing or modifying one or more symbols or characters (such as an alphanumeric character or symbol) in the authentication realm that are located at the position(s) of the wildcard element(s). Consequently, the communication techniques may improve the user experience when using electronic device 110-1, access point 116-1 and/or the network, or managing the network.

Figure 2:
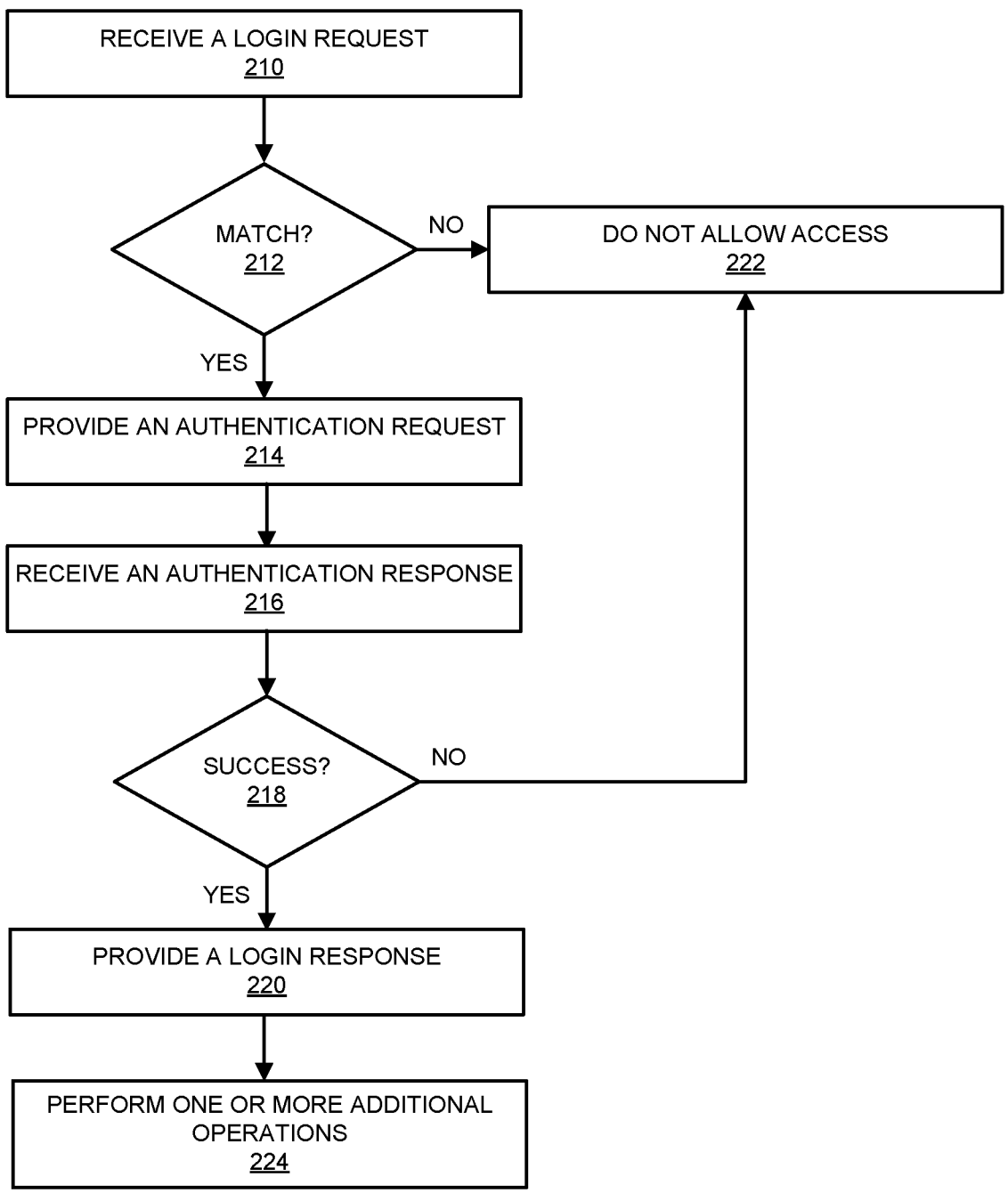
FIG. 2 is a flow diagram illustrating an example of a method for performing flexible authentication to an authentication realm in a network using a computer system in FIG. 1 in accordance with an embodiment of the present disclosure.

We now describe embodiments of the method. FIG. 2 presents a flow diagram illustrating an example of a method 200 for performing flexible authentication to an authentication realm in a network using a computer system, such as computer system 112 in FIG. 1. During operation, the computer system may receive, associated with an electronic device, a login request (operation 210), where the login request includes or specifies the authentication realm in the network. Then, the computer system may compute whether the authentication realm at least partially matches a predefined authentication realm (operation 212) in the network, where the predefined authentication realm in the network includes at least one wildcard element, and where the partial match is for elements in the predefined authentication realm other than the at least one wildcard element. When there is a partial match (operation 212), the computer system may provide, addressed to the second computer system, an authentication request (operation 214) based at least in part on the login request. Next, the computer system may receive, associated with the second computer system, an authentication response (operation 216). When the authentication response indicates successful authentication (operation 218), the computer system may provide, addressed to the electronic device, a login response (operation 220) that indicates a successful login to the network. Otherwise, when there is not at least the partial match (operation 212) or when the authentication response does not indicate successful authentication (operation 218), the computer system may not approve or allow access (operation 222) by the electronic device (or a user of the electronic device) to the network.

Note that the computer system may include a controller of computer network devices in the network. Moreover, the second computer system may include a AAA server. Furthermore, the authentication realm may be associated with an address in the network of the second computer system. Additionally, the authentication request may include a remote authentication dial-in user service authentication request and the authentication response may include a RADIUS authentication response. In some embodiments, the computer system may not be preconfigured with all elements in the authentication realm (and, thus, all the elements in the authentication realm may not be predefined in the computer system).

In some embodiments, the computer system may optionally perform one or more additional operations (operation 224). For example, computing whether there is at least a partial match (operation 212) may include performing a look-up operation in a data structure with predefined authentication realms and one or more associated addresses of one or more computer systems that provide authentication services for the predefined authentication realms. Additionally, when there is a full match between the authentication realm and a second predefined authentication realm, the computer system may perform authentication associated with the electronic device with a third computer system associated with the second predefined authentication realm. Note that the third computer system may be the same as or different from the second computer system.

Figure 3:
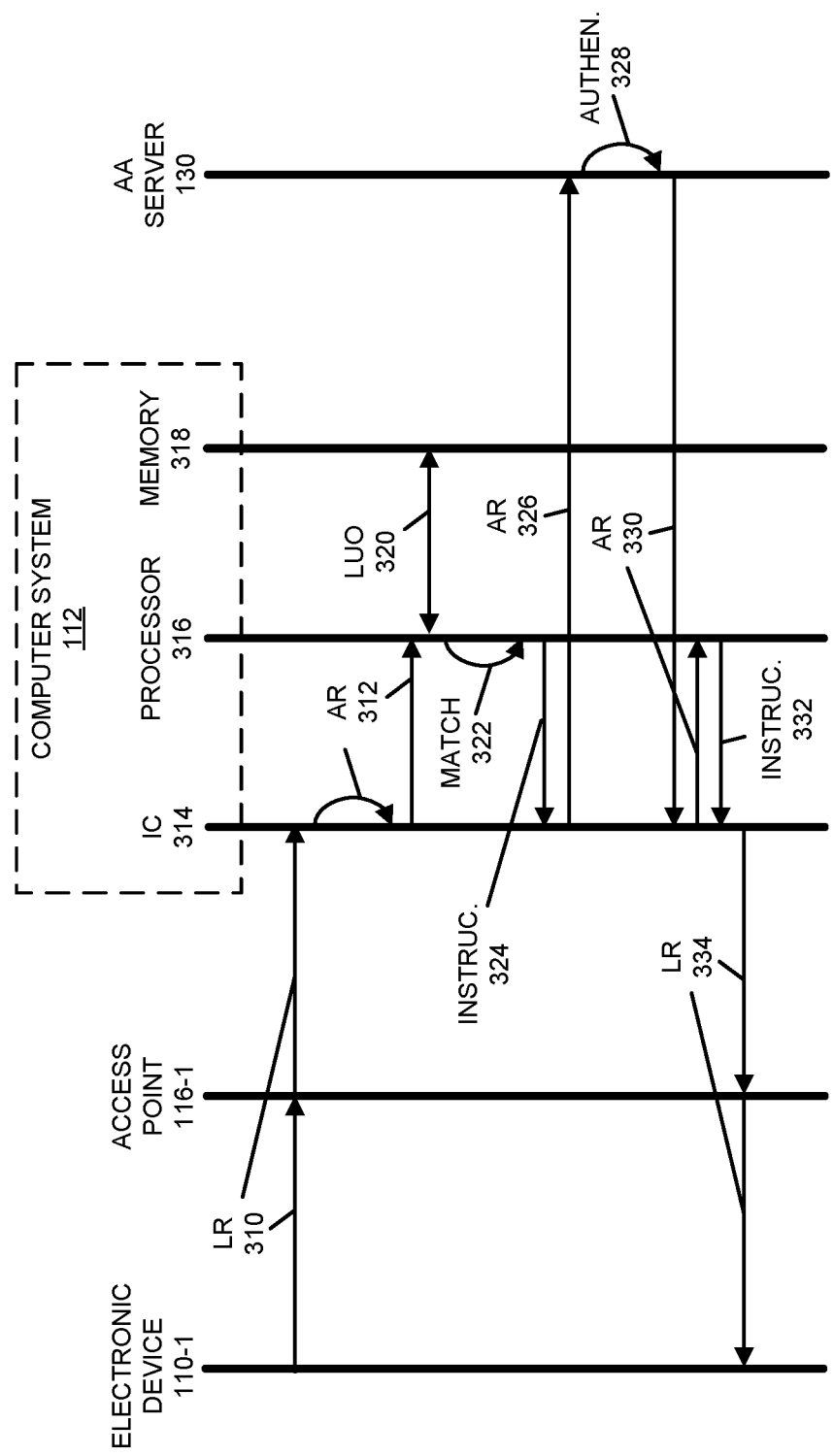
FIG. 3 is a drawing illustrating an example of communication among the electronic devices in FIG. 1 in accordance with an embodiment of the present disclosure.

Embodiments of the communication techniques are further illustrated in FIG. 3, which presents a drawing illustrating an example of communication among electronic device 110-1, access point 116-1, computer system 112, and AAA server 130. In FIG. 3, an interface circuit in electronic device 110-1 may provide, to computer system 112 via access point 116-1, a login request (LR) 310 that includes or specifies an authentication realm (AR) 312 in a network.

After receiving login request 310, an interface circuit (IC) 314 in computer system 112 may provide authentication realm 312 (or information specifying authentication realm 312) to processor 316 in computer system 112. Then, processor 316 may perform a look-up operation (LUO) 320, based at least in part on authentication realm 312, in a data structure in memory 318 in computer system 112. This look-up operation 320 may allow processor 316 to compute whether authentication realm 312 at least partially matches 322 a predefined authentication realm in the network, where the predefined authentication realm in the network includes at least one wildcard element or symbol, and where the partial match is for elements in the predefined authentication realm other than the at least one wildcard element. Moreover, when there is a partial match (or a full match), look-up operation 320 may provide a network address of a computer system that provides authentication services for the authentication realm (such as an IP address of AAA server 130) to processor 316.

Furthermore, when there is a partial match 322, processor 316 may instruct 324 interface circuit 314 to provide, to AAA server 130, an authentication request (AR) 326 based at least in part on login request 310. After receiving authentication request 326, AAA server 130 may authenticate 328 a user of electronic device 110-1. Next, AAA server 130 may provide an authentication response (AR) 330 to computer system 112.

After receiving authentication response 330, interface circuit 314 may provide authentication response 330 to processor 316. When the authentication response 330 indicates that the user of electronic device 110-1 was successful authenticated, processor 316 may instruct 332 interface circuit 314 to provide, to electronic device 110-1 via access point 116-1, a login response (LR) 334 that indicates a successful login to the network.

Figure 4:
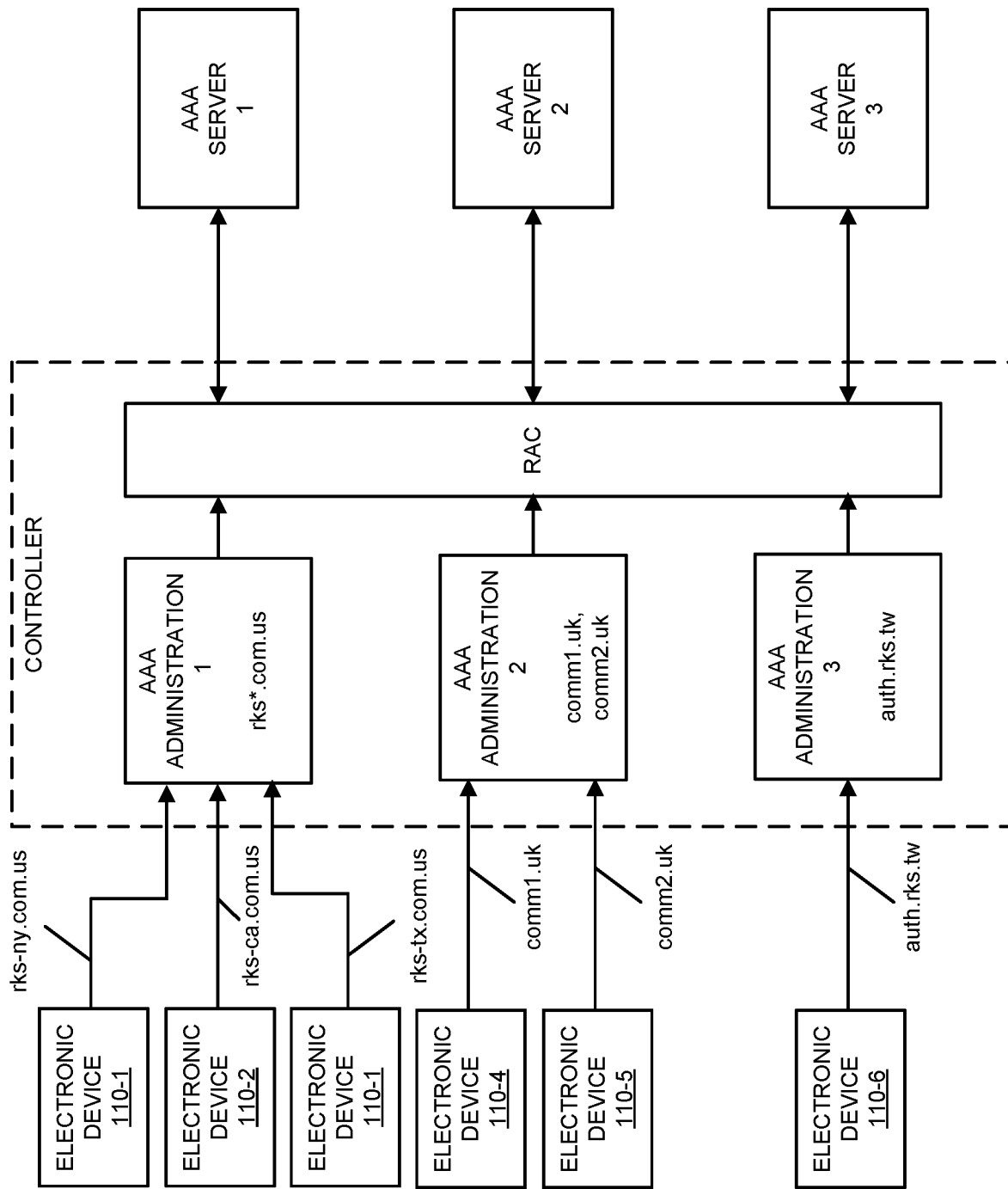
FIG. 4 is a drawing illustrating an example of authentication of electronic devices in accordance with an embodiment of the present disclosure.

We now further describe the communication techniques. Notably, the communication techniques allow a single AAA server to support more than one authentication realm in a network for a controller. This type of virtual mapping may be used by enterprises that seek a low-cost centralized authentication/authorization server solution. Login via a centralized authentication/authorization server is increasingly common. Therefore, the controller may provide a login system via one or more external AAA servers. Note that the software in the controller may support logging administration activities for users of a AAA server. In the controller, an authentication realm may be used to indicate a target AAA server for handling authentication/authorization. Consequently, the authentication realm of a AAA server may be unique in the login system. However, if a single AAA server can only map to a single authentication realm, this would make managing or administering the AAA servers more complicated and less flexible. In order to address these problems, the software on the controller may support multiple ways to configure an authentication realm on a single AAA server, including: a single authentication realm (such as ldap.rks.com); multiple authentication realms (such as ldap.rks.com, ldap2.rks.com, ldap3.rks.com, etc., where 'LDAP' is a lightweight directory access protocol); and a wildcard authentication realm (such as ldap*.rks.com). These embodiments are shown in FIG. 4, which presents a drawing illustrating an example of authentication of electronic devices. In FIG. 4, the different AAA servers may be associated with different customers. A given customer may only have one AAA server handling authentication/authorization. The customers may use authentication realms to separate the login information of their users by states, regions, countries, cities, etc., so that they can have improved tracking of user activities.

In some embodiments, the controller may allow a user to login to access a AAA server using an address or authentication realm that includes one or more wildcard element(s). This flexibility may allow multiple different authentication realms to be defined by users without updating the software of the controller. When there is a partial match of the authentication realm (such as to the remainder of the authentication realm other than the one or more wildcard element(s)), the controller may look up an associated AAA server, and may provide an authentication request to the AAA server. (Alternatively, in some embodiments, a partial match may be computed based at least in part using some or all of the wildcard elements.) When an authentication response from the AAA server indicates a successful login, the controller may notify the user.

Figure 5:
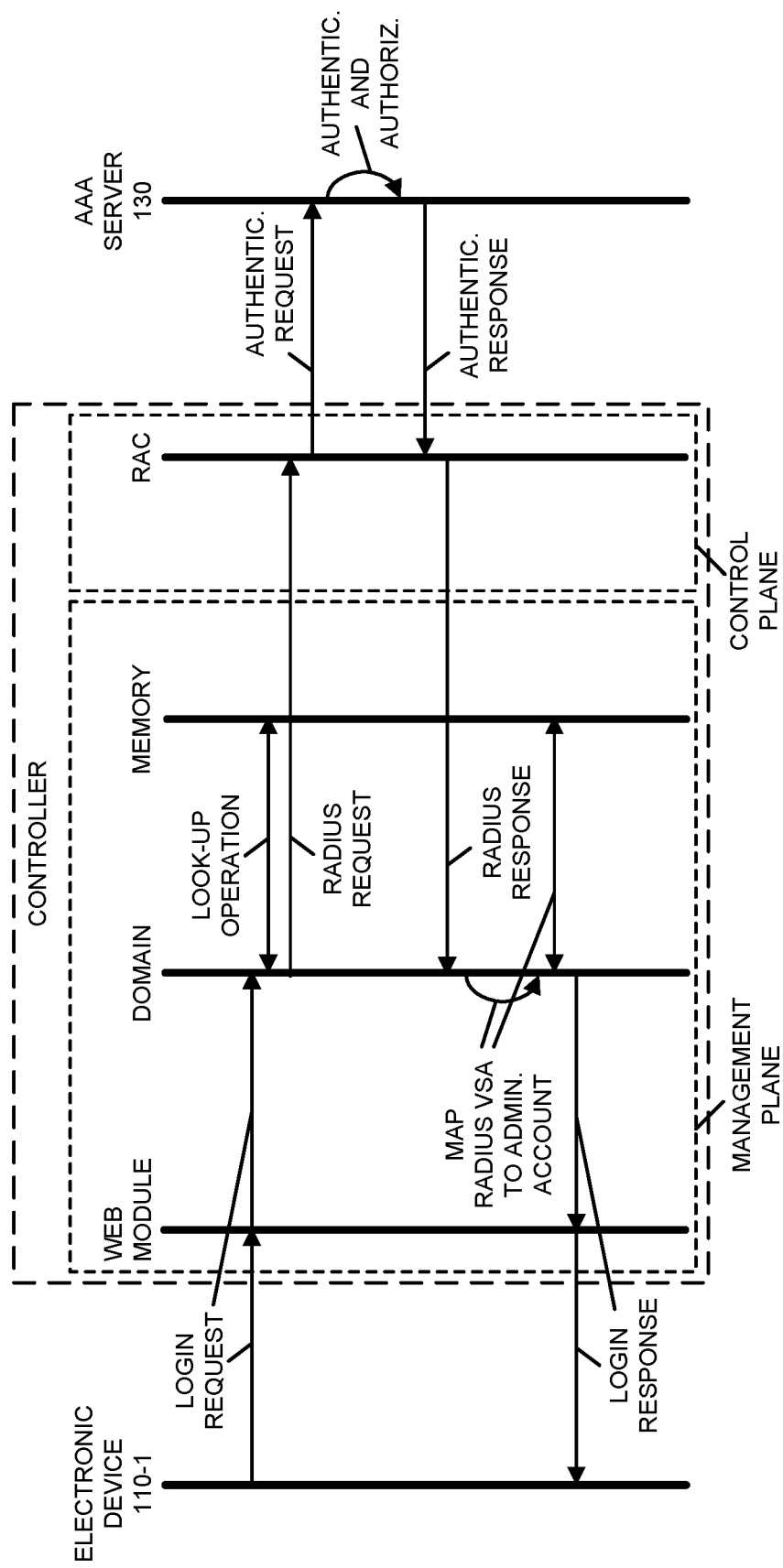
FIG. 5 is a drawing illustrating an example of communication among the electronic devices in FIG. 1 in accordance with an embodiment of the present disclosure.

FIG. 5 presents a drawing illustrating an example of communication among the electronic devices in FIG. 1. A prerequisite to FIG. 5, is that a network administrator has configured a controller (e.g., using an authentication technique, such as RADIUS, active directory (AD) or LDAP) with an authentication realm (such as ruckus*.com) of a AAA server, which is mapped to an IP address of the AAA server, e.g., 10.10.10.10. This administration AAA configuration may be saved in a radio access control (RAC) in a control-plane (CP) container. When an authentication realm is provided in login request as value ruckus*.com, the controller may proxy the login request to the IP address of the AAA server (10.10.10.10) and may provide an authentication request to the AAA server.

For example, a user may login providing a username of abhishek@ruckuswireless.com via a web module or portal or user interface. After receiving the login request credentials, a web module or a domain may look up available authentication realms (e.g., in a look-up table) and find or identify a best match for the authentication realm. A partial match, e.g., for ruckus*.com, may be found (instead of an exact match). When generating a RADIUS authentication request, the username vendor specific attribute (VSA) value may be abhishek@ruckus*.com (thus, the VSA may be username="abhishek@ruckus*.com"). Moreover, when this authentication request is received at the RAC, the authentication realm (ruckus*.com) may be removed from the username VSA. Instead, using this value (ruckus*.com) the related IP address of the AAA server may be included. Next, the proxy flow may perform authentication via the AAA server.

In FIG. 5, note that the web module, the domain, and the memory (such as a database or a data structure) may be implemented using a three-layer architecture. Notably, the web module may be implemented in a presentation layer, the domain may be implemented in a logical layer, and the database or the data structure may be implemented in a persistency layer.

While FIGS. 3 and 5 illustrate communication between components using unidirectional or bidirectional communication with lines having single arrows or double arrows, in general the communication in a given operation in this figure may involve unidirectional or bidirectional communication. Moreover, while FIGS. 3 and 5 illustrate operations being performed sequentially or at different times, in other embodiments at least some of these operations may, at least in part, be performed concurrently or in parallel.

Figure 6:
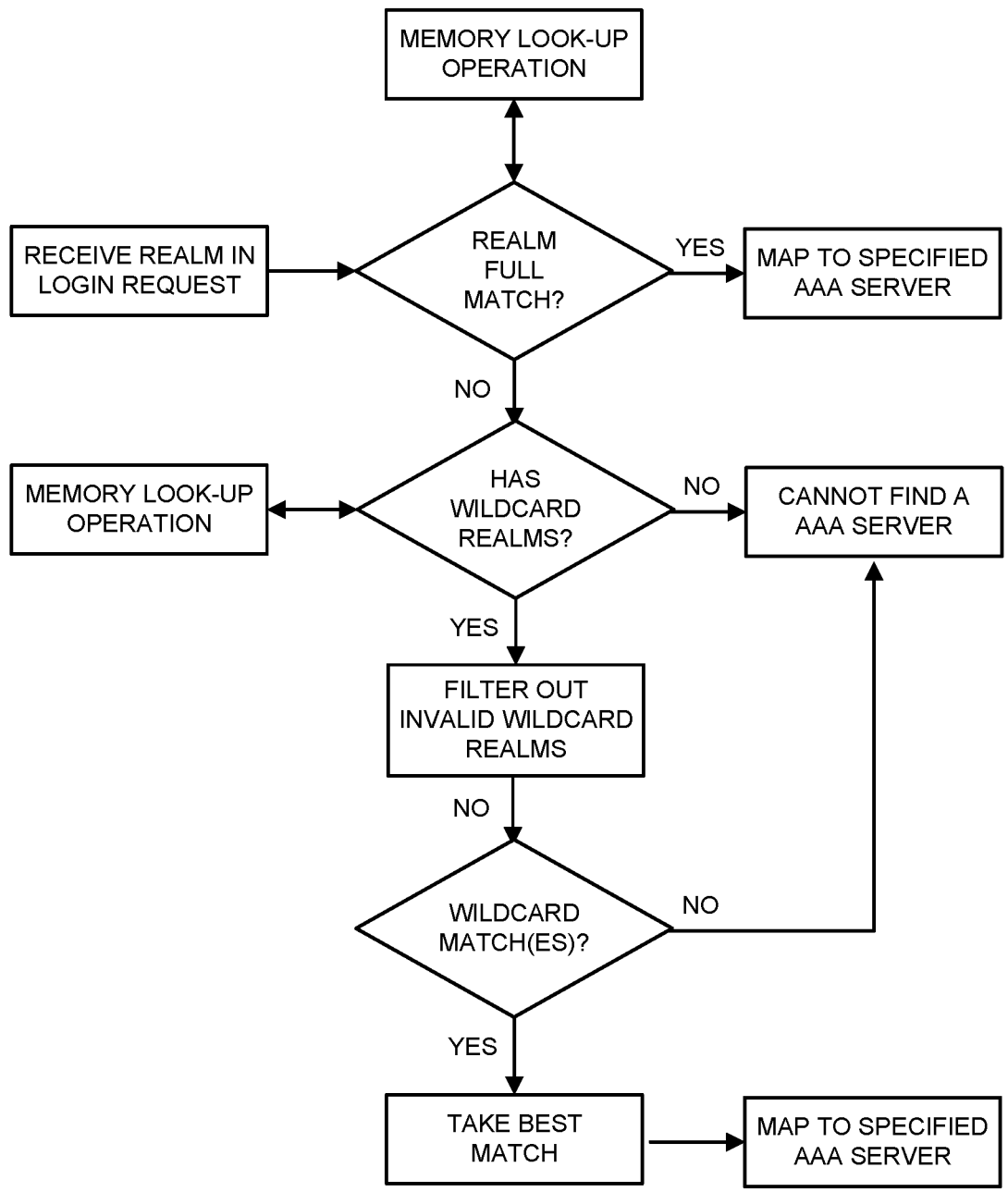
FIG. 6 is a flow diagram illustrating an example of a method for performing flexible authentication to an authentication realm in a network using a computer system in FIG. 1 in accordance with an embodiment of the present disclosure.

FIG. 6 presents a flow diagram illustrating an example of a method 600 for performing flexible authentication to an authentication realm in a network using a computer system, such as computer system 112 in FIG. 1. Note that invalid wildcard realms may: start with *, only include *, contain .*., or end with *.

In some embodiments of method 200 and/or 600, there may be additional or fewer operations. Furthermore, the order of the operations may be changed, and/or two or more operations may be combined into a single operation.

We now describe embodiments of an electronic device, which may perform at least some of the operations in the communication techniques. FIG. 7 presents a block diagram illustrating an example of an electronic device 700 in accordance with some embodiments, such as one of: base station 108, one of electronic devices 110, computer system 112, one of access points 116, one of radio nodes 118, switch 128, or AAA server 130. This electronic device includes processing subsystem 710, memory subsystem 712, and networking subsystem 714. Processing subsystem 710 includes one or more devices configured to perform computational operations. For example, processing subsystem 710 can include one or more microprocessors, graphics processing units (GPUs), ASICS, microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include DRAM, static random access memory (SRAM), and/or other types of memory. In some embodiments, instructions for processing subsystem 710 in memory subsystem 712 include: one or more program modules or sets of instructions (such as program instructions 722 or operating system 724, such as Linux, UNIX, Windows Server, or another customized and proprietary operating system), which may be executed by processing subsystem 710. Note that the one or more computer programs, program modules or instructions may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as antenna nodes 708, e.g., a metal pad or a connector, which can be coupled to the one or more antennas 720, or nodes 706, which can be coupled to a wired or optical connection or link. Thus, electronic device 700 may or may not include the one or more antennas 720. Note that the one or more nodes 706 and/or antenna nodes 708 may constitute input(s) to and/or output(s) from electronic device 700.) For example, networking subsystem 714 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 700 may be adapted or changed using pattern shapers (such as directors or reflectors) and/or one or more antennas 720 (or antenna elements), which can be independently and selectively electrically coupled to ground to steer the transmit antenna pattern in different directions. Thus, if one or more antennas 720 include N antenna pattern shapers, the one or more antennas may have 2N different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 700 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Moreover, electronic device 700 may include a user-interface subsystem 730, such as: a mouse, a keyboard, a trackpad, a stylus, a voice-recognition interface, and/or another human-machine interface. In some embodiments, user-interface subsystem 730 may include or may interact with a touch-sensitive display in display subsystem 726.

Electronic device 700 can be (or can be included in) any electronic device with at least one network interface. For example, electronic device 700 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments instructions 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714 and/or of electronic device 700. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 722, operating system 724 (such as a driver for interface circuit 718) or in firmware in interface circuit 718. Alternatively or additionally, at least some of the operations in the communication techniques may be implemented in a physical layer, such as hardware in interface circuit 718.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
an interface circuit configured to communicate with an electronic device and a second computer system;
a processor coupled to the interface circuit; and
memory, coupled to the processor, configured to store program instructions, wherein, when executed by the processor, the program instructions cause the computer system to perform operations comprising:
receiving, associated with the electronic device, a login request, wherein the login request comprises or specifies an authentication realm in a network;
computing whether the authentication realm at least partially matches a predefined authentication realm in the network, wherein the predefined authentication realm in the network comprises at least one wildcard element, and wherein the partial match is for elements in the predefined authentication realm other than the at least one wildcard element;
when there is a partial match, providing, addressed to the second computer system, an authentication request based at least in part on the login request, wherein the second computer system provides authentication services for multiple predefined authentication realms corresponding to a customer associated with the multiple predefined authentication realms, the multiple predefined authentication realms comprise the predefined authentication realm, the multiple predefined authentication realms are segmented according to geographic regions comprising cities, states or countries, and different second computer systems than the second computer system provide authentication services for different customers than the customer;
receiving, associated with the second computer system, an authentication response; and
when the authentication response indicates successful authentication, providing, addressed to the electronic device, a login response that indicates a successful login to the network.

2. The computer system of claim 1, wherein the computer system comprises a controller of computer network devices in the network.

3. The computer system of claim 1, wherein the second computer system comprises an authentication, authorization and accounting (AAA) server.

4. The computer system of claim 1, wherein the authentication realm is associated with an address in the network of the second computer system.

5. The computer system of claim 1, wherein, when there is a full match between the authentication realm and a second predefined authentication realm, the operations comprise performing authentication associated with the electronic device with a third computer system associated with the second predefined authentication realm.

6. The computer system of claim 5, wherein the third computer system is different from the second computer system.

7. The computer system of claim 1, wherein the computer system is not preconfigured with all elements in the authentication realm.

8. The computer system of claim 1, wherein computing whether there is at least a partial match comprises performing a look-up operation in a data structure with predefined authentication realms and one or more associated addresses of one or more computer systems that provide authentication services for the predefined authentication realms.

9. The computer system of claim 1, wherein the authentication request comprises a remote authentication dial-in user service (RADIUS) authentication request and the authentication response comprises a RADIUS authentication response.

10. A non-transitory computer-readable storage medium for use in conjunction with a computer system, the computer-readable storage medium storing program instructions that, when executed by the computer system, cause the computer system to perform operations comprising:
receiving, associated with an electronic device, a login request, wherein the login request comprises or specifies an authentication realm in a network;
computing whether the authentication realm at least partially matches a predefined authentication realm in the network, wherein the predefined authentication realm in the network comprises at least one wildcard element, and wherein the partial match is for elements in the predefined authentication realm other than the at least one wildcard element;
when there is a partial match, providing, addressed to the second computer system, an authentication request based at least in part on the login request, wherein the second computer system provides authentication services for multiple predefined authentication realms corresponding to a customer associated with the multiple predefined authentication realms, the multiple predefined authentication realms comprise the predefined authentication realm, the multiple predefined authentication realms are segmented according to geographic regions comprising cities, states or countries, and different second computer systems than the second computer system provide authentication services for different customers than the customer;
receiving, associated with the second computer system, an authentication response; and
when the authentication response indicates successful authentication, providing, addressed to the electronic device, a login response that indicates a successful login to the network.

11. The non-transitory computer-readable storage medium of claim 10, wherein the computer system comprises a controller of computer network devices in the network.

12. The non-transitory computer-readable storage medium of claim 10, wherein the second computer system comprises an authentication, authorization and accounting (AAA) server.

13. The non-transitory computer-readable storage medium of claim 10, wherein, when there is a full match between the authentication realm and a second predefined authentication realm, the operations comprise performing authentication associated with the electronic device with a third computer system associated with the second predefined authentication realm.

14. The non-transitory computer-readable storage medium of claim 10, wherein the computer system is not preconfigured with all elements in the authentication realm.

15. A method for performing flexible authentication to an authentication realm in a network, comprising:

by a computer system:

receiving, associated with an electronic device, a login request, wherein the login request comprises or specifies the authentication realm in the network;

computing whether the authentication realm at least partially matches a predefined authentication realm in the network, wherein the predefined authentication realm in the network comprises at least one wildcard element, and wherein the partial match is for elements in the predefined authentication realm other than the at least one wildcard element;

when there is a partial match, providing, addressed to the second computer system, an authentication request based at least in part on the login request, wherein the second computer system provides authentication services for multiple predefined authentication realms corresponding to a customer associated with the multiple predefined authentication realms, the multiple predefined authentication realms comprise the predefined authentication realm, the multiple predefined authentication realms are segmented according to geographic regions comprising cities, states or countries, and different second computer systems than the second computer system provide authentication services for different customers than the customer;

receiving, associated with the second computer system, an authentication response; and when the authentication response indicates successful authentication, providing, addressed to the electronic device, a login response that indicates a successful login to the network.

16. The method of claim 15, wherein the computer system comprises a controller of computer network devices in the network.

17. The method of claim 15, wherein the second computer system comprises an authentication, authorization and accounting (AAA) server.

18. The method of claim 15, wherein, when there is a full match between the authentication realm and a second predefined authentication realm, the method comprises performing authentication associated with the electronic device with a third computer system associated with the second predefined authentication realm.

19. The method of claim 18, wherein the third computer system is different from the second computer system.

20. The method of claim 15, wherein the computer system is not preconfigured with all elements in the authentication realm.

* * * * *